Dec. 23, 1958   B. M. RONAY   2,866,074
AFTER COOLER FOR WELDING TORCHES
Filed July 19, 1956   2 Sheets-Sheet 1
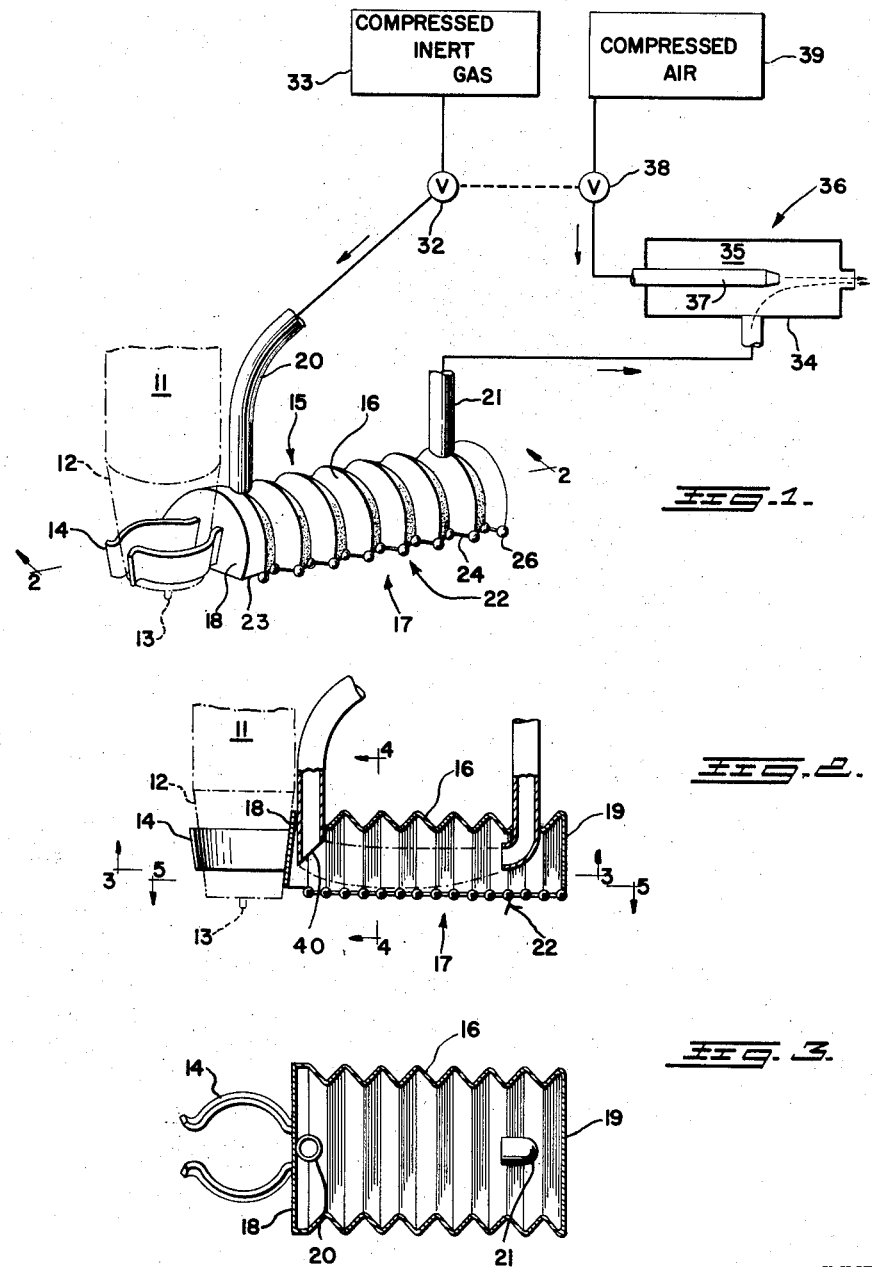
INVENTOR
BELA M. RONAY
BY George Sipkin
B. L. Zanquill
ATTORNEYS Dec. 23, 1958   B. M. RONAY   2,866,074
AFTER COOLER FOR WELDING TORCHES
Filed July 19, 1956   2 Sheets-Sheet 2
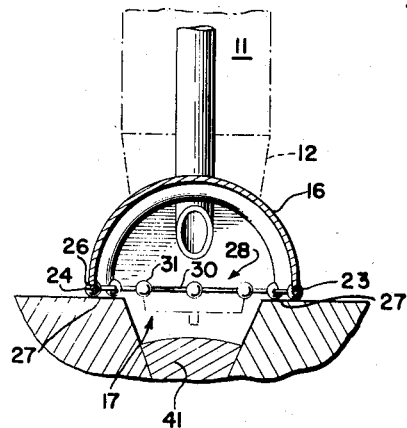
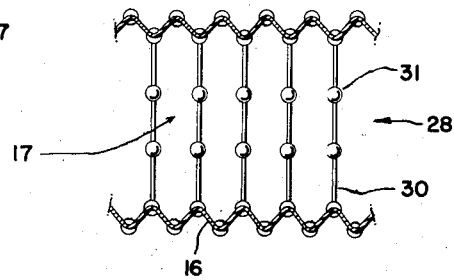
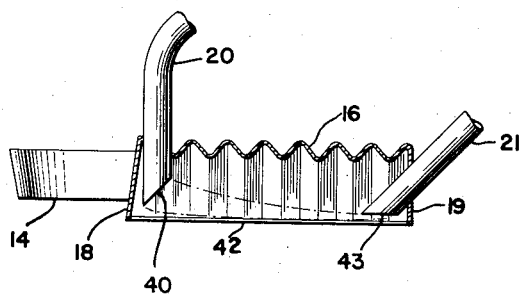
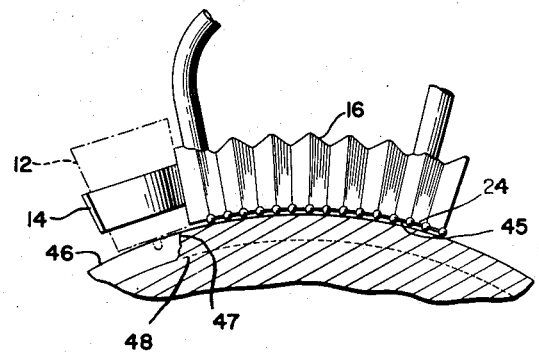
INVENTOR
BELA M. RONAY
BY George Sipkin
B. L. Zangaill
ATTORNEYS United States Patent Office 2,866,074
Patented Dec. 23, 1958

2,866,074

AFTER COOLER FOR WELDING TORCHES

Bela M. Ronay, Annapolis, Md.

Application July 19, 1956, Serial No. 598,970

10 Claims. (Cl. 219—74)

(Granted under Title 35, U. S. Code (1952), sec. 266)

The invention described herein may be manufactured and used by or for the Government of the United States of America for governmental purposes without the payment of any royalties thereon or therefor.

This invention relates to arc welding and more particularly it relates to an after cooler for use in conjunction with an arc welding torch or gun, and specifically to a flexible after cooler for inert gas-shielded tungsten electrode or inert gas-shielded consumable electrode arc welding of titanium.

In the prior art it is well known that the weld metal progressing away from the torch must be protected from contamination by surrounding or atmospheric gases until it is cooled sufficiently, otherwise the weld will be brittle or porous. It is also known that shielding the weld by blanketing it with an inert gas for a time sufficient for it to cool will solve the problem of contamination. This shielding of the weld in the prior art is carried out by providing an enclosed boxlike structure attached to the welding torch and maintaining an inert atmosphere within the enclosure.

The rigid nature of such a device and its size and fixed position with respect to the welding torch render the device practicable only for mechanized welding of linear or flat surfaces, and very impractical for welding structures having other than flat contours or structures having surfaces in more than one plane or in other than flat positions. The latter type of structures are encountered often in industry and must be welded manually. For example, in the welding of drums, the prior art rigid devices of the type discussed are useless. At present the only practicable method of making weldments in drums is to provide the interior of the drum with a helium atmosphere. Welding in the drum, which is equipped with a plastic top to permit limited visibility, is then accomplished by reaching into the drum with rubber gloves sealed in the wall of the drum. Such an expedient permits only small weldments; and the double handicap of limited hand flexibility and visibility enables fabrication of only the simplest structures. Further such a method is cumbersome inasmuch as the lid of the drum has to be removed after each assembly and upon replacing it on another assembly the drum must be purged of air before welding. Such a method is very wasteful of inert gas and is quite unsuitable for production welding, especially with titanium.

The high strength and corrosion resistant characteristics of titanium make it a desirable weld material in all types of structures. Titanium, at temperatures above 1200° F., has high affinity for all elements in air. In welding, the deposit of titanium weld metal in the wake of the torch remains for a brief period above 1200° F., while it cools from the molten state. Exposure to the surrounding atmosphere or air during this brief period while above 1200° F. is sufficient to contaminate the weld metal to such an extent that it becomes glass-like in brittleness. Because of this titanium cannot be used for structures designed for welded fabrication, unless the size and shape of the structure e. g. flat, permits a mechanized welding procedure.

This invention provides an after cooler for use with a welding torch or gun which permits contamination-free welding of any structure amenable to arc welding whatever its shape or contour and whatever its position. The after cooler of the invention, briefly, comprises a guide duct or shield having a gas inlet and outlet. The guide duct is adapted to be attached to a welding torch or gun to provide a substantially air-tight space behind the torch. The guide duct is made flexible whereby it may be positioned to occupy any plane or planes and maintain that position to thereby enclose an area immediately above and surrounding the hot weld metal in the wake of the torch no matter what the shape or contour of the surface being welded. A further feature embodied in the after cooler of the invention is the provision of an outlet so positioned that the path of the inert gas may be positively guided over and substantially adjacent the weld metal for maximum cooling with a minimum of gas consumption.

An object of the invention is the provision of an after cooler that permits contamination-free welding of surfaces of various shapes and contours and in all positions of the surfaces.

Another object of the invention is to provide an after cooler for use with an arc welding torch which may be flexed to any of a plurality of positions whereby to enclose and surround with inert gas any hot weld trail despite the contour of the structure being welded.

Another object of the invention is the provision of an after cooler for an arc welding apparatus which permits use of titanium in the production welding of any of a plurality of differently contoured structures susceptable to welding without contamination of the titanium.

A further object of the invention is the provision of an inert gas guide duct which may be flexed to and maintain a plurality of positions whereby to conform to the contours of a surface being welded.

Still another object of the invention is to provide an inert gas shield having inert gas inlet and outlet means so positioned with respect to one another that the flow of inert gas is positively guided over the hot weld metal in the wake of an electric welding torch whereby maximum cooling is obtained with a minimum expenditure of gas.

Another object of the invention is the provision of a flexible inert gas guide duct which permits effective shielding of hot weld metals on other than flat contoured structures.

Other objects and many of the attendant advantages of this invention will be readily appreciated as the same becomes better understood by reference to the following detailed description when considered in connection with the accompanying drawings wherein:

Fig. 1 is a perspective view of an after cooler in accordance with the invention in combination with an arc welding torch or gun, including means for regulating the flow of cooling gas;

Fig. 2 is a cross sectional view of the after cooler shown in Fig. 1 taken along lines 2—2;

Fig. 3 is a view in elevation of the after cooler taken along lines 3—3 of Fig. 2;

Fig. 4 is a cross sectional view of the after cooler taken along lines 4—4 of Fig. 2 in operative relation to a seam being welded;

Fig. 5 is a fragmentary sectional view taken along lines 5—5 of Fig. 2 showing the open bottom of the after cooler;

Fig. 6 is a view similar to Fig. 2 showing a modification; and

Fig. 7 is a perspective view of the invention positioned with respect to a curved surface.

Referring now to the drawings, wherein like reference characters designate like or corresponding parts throughout the several views, there is shown in Figs. 1, 2 and a fragment of a body of an electric arc welding torch generally designated by 11 having a ceramic portion 12 and an electrode 13 preferably tungsten. The torch which forms per se no part of the invention may be adapted for shielded non-consumable electrode arc welding or shielded consumable electrode arc welding as understood by those conversant with the art of welding. Affixed to the tapered ceramic portion 12 of the body 11 as by a tapered spring clamp 14 or the like is an inert gas guide duct or shield generally designated by reference 15 comprising the after cooler of the invention.

The guide duct 15 is flexible and comprises a heat resistant pliable or flexible cover in the form of a bellows 16 of suitable metal and preferably of steel, having a substantially semi-cylindrical body shape and having an open bottom generally designated by 17. The semi-cylindrical bellows 16 may comprise a series of adjacent circumvolutions having substantially a sine wave shape in cross section. The bellows has semi-cylindrical end closure plates or walls 18 and 19; the spring clamp 14 being secured to end plate 18 by any suitable means, e. g. brazing. Inserted into holes formed in the bellows 16 and secured to the bellows along radial lines perpendicular to a line across the open bottom 17 of the semi-circular bellows 16 are pliable inlet and exhaust tubes 20 and 21, preferably formed from copper; tube 20 being placed on the bellows closely adjacent the end plate 18.

In a preferred embodiment shown in Figs. 1, 2, 4 and 5 and particularly Fig. 4, key chains generally designated by 22 of stainless steel or other suitable metal are brazed or the like along or about the edges 23 forming the open bottom 17 of the bellows body. Each link section 24 of key chain 22 is brazed or the like to the edges 23 of the bellows 16 and to the ball sockets 26 of key chain 22 which ride on the banks 27 of a channel being welded (Fig. 4).

The key chains 22 function to stiffen the bellows and to maintain its shape while permitting it to be flexed to and to maintain any position to which it is bent. To further aid key chains 22 where necessary, and to prevent spreading of the open bottom 17, there is connected across the open portion 17 of the bellows and the inner ones of ball sockets 26 of key chain 22 a plurality of key chains generally designated by 28 (Figs. 4 and 5). Links 30 of key chain 28 are similarly brazed into the ball sockets 31 thereof. Balls 31 are preferably made to have a smaller diameter than balls 26 so as not to contact the hot weld metal 41.

Referring again to Fig. 1 the inlet tube 20 is connected through a regulatable valve 32 to a source of compressed inert gas 33, preferably helium. The exhaust tube 21 is connected to the wall 34 of an open ended cylinder 35 which comprises part of an eductor generally designated by reference 36. The eductor 36 is essentially a jet air pump comprising with outer cylinder 35 an inner concentric pipe 37 connected through a regulatable valve 38 to a source of compressed air 39. As is understood in the art the jet of air issuing from pipe 37 causes a partial vacuum or differential pressure in the cylinder 35 which pulls the inert gas through and from the guide duct 15. The regulation of gas flow by means of valves 32 and 38 permits development of pressures slightly above ambient within the bellows 16 which prevents the surrounding medium from entering the duct thereby keeping the freshly deposited weld metal from becoming contaminated before cooling. As seen in Fig. 2 the outlet end 40 of inlet tube 20 is truncated to direct the flow of inert gas down and along the weld behind the torch 11; the exhaust tube pulling the gas through the duct.

In another embodiment (Fig. 6), the edges of the bellows may be secured to relatively stiff though flexible wires 42, rather than key chains, though wires 42 are more subject to fatigue than key chains. Further the discharge inlet 43 of exhaust tube 21 may be positioned tangentially to the contour of the surface being welded whereby the layer of gas is positively guided along and adjacent the weld. As is apparent with the tubes so positioned the layer of air near the hotter part of the weld immediately in the wake of the torch will be thicker and as it progresses along the weld will become thinner along previously cooled portions of the weld metal.

In operation then, with the exhaust inlet 43 positioned as in Fig. 2 or tangentially as explained above, and through control of the inert gas valve 38 and the compressed air valve 32, which may be ganged, the gas flow rate under the shield may be adjusted so as to minimize gas consumption while obtaining maximum cooling and at the same time adjusted so as not to interfere with the gas shield of the torch. As is understood any areas between the torch and bellows not protected by the shield will be protected by the gas shield issuing from the torch.

The dimensions of the inlet and discharge tubes and the length and diameter of the bellows are such that they permit passage of a sufficient volume of gas to cool the weld, shielded by the after cooler, to below a temperature (1200° F. for titanium) which would render the weld subject to contamination. To illustrate the dimensions of the after cooler the bellows in one embodiment was 1" in diameter and 2½" long with inlet and discharge tubes 5/16" in diameter.

Fig. 7 shows the after cooler in position for welding a curved structure. While there is some spacing 45 between the links 24 welded to the edges of the bellows and the banks 46 and 47 of the channel 48 being welded, the loss of inert gas through this space is not appreciable since most of the gas is positively guided along the weld in channel 48.

As may be appreciated from the above description, since the guide duct or shield 16 and the exhaust tube inlet are in fixed relation the whole is adjustable to match the contour of any geometry normally occuring in weldments regardless of shape, size or position. It is seen therefor that this novel device will enable effective cooling of welds without contamination with the utilization of conventional equipment thereby releasing titanium and titanium alloys for an unlimited number of industrial applications.

Where it is necessary to protect the underside of the weld a backing or bridging strip or an inert gas backing blanket, confined by a pan or the like and movable with the torch, may be provided as is well known to the art.

Obviously many modifications and variations of the present invention are possible in the light of the above teachings. It is therefore to be understood that within the scope of the appended claims the invention may be practiced otherwise than as specifically described.

What is claimed is:

1. An elongated inert gas guide duct adapted to be attached to an arc welding torch whereby hot weld metal in the wake of the torch may be shielded, said guide duct comprising a longitudinally corrugated sheet of heat and corrosion resistant material bent transversely to a substantially semi-cylindrical shape, end closures secured to the ends of said shape to thereby form a body closed on three sides, the open side of said body being adapted to cover said hot weld metal, said corrugations rendering said body pliable whereby it may be bent to conform to a variety of different weld-line contours, and means for passing and controlling a longitudinal flow of inert gas through said guide duct in the general direction of said hot weld metal.

2. A cooling gas shield adapted for use in conjunction with an arc welding torch whereby hot weld metals in the wake of the torch are protected from contamination, said shield comprising an elongated flexible bellows adapted to be longitudinally bent to conform to and maintain any weld-line shape, said bellows comprising an enclosure open on a side adapted to overlie the hot weld metal, means for stiffening said bellows, gas inlet means at one end of said bellows, and gas outlet means at the other end of said bellows, the orifices of said gas inlet and outlet means within said bellows being positioned to positively guide said cooling gas over the hot weld metal.

3. An after cooler of a type described adapted to be attached to an arc welding torch whereby hot weld metal in the wake of the torch may be shielded from ambient air, said after cooler comprising a hollow cover adapted to overlie the hot weld metal, said cover comprising a pair of end walls and an elongated wall joining said end walls, torch securing means attached to the outside of a first of said walls, said cover having therein a gas inlet means with a discharge end adjacent the inside of said first wall, and a gas outlet means with an intake end adjacent the inside of the other of said pair of end walls, said discharge and intake ends being longitudinally spaced in the direction away from said torch securing means.

4. An after cooler as defined in claim 3 in combination with flow-control means for controlling the flow of gas passing from said discharge end to said intake end.

5. An after cooler as defined in claim 3 but further characterized by said cover being bendable longitudinally to different shapes and constructed to remain in the shape to which it is bent.

6. An after cooler as defined in claim 5 but further characterized by said gas inlet and outlet means comprising inlet and outlet conduit portions within said cover, said conduit portions comprising discharge and intake openings facing each other within said cover.

7. An after cooler of a type described adapted to be attached to an arc welding torch whereby hot weld metal in the wake of the torch may be shielded from ambient air, said after cooler comprising a pliable elongated hollow cover adapted to overlie the hot weld metal, said cover having a pair of end wall means and elongated sides and top extending between said pair of end wall means, said cover having a gas inlet means at one of said pair of end wall means and a gas outlet at the other of said pair of end wall means.

8. An after cooler of a type described adapted to be attached to an arc welding torch whereby hot weld metal in the wake of the torch may be shielded from ambient air, said after cooler comprising a pliable hollow cover adapted to overlie the hot weld metal, said cover comprising a pair of end walls, torch securing means attached to the outside of a first of said end walls, a gas inlet means with a discharge end adjacent the inside of said first wall, and gas outlet means with an intake end adjacent the inside of the other of said pair of end walls, said discharge and intake ends being longitudinally spaced in the direction away from said torch securing means, said cover having only said discharge end and said intake end within it.

9. An after cooler as defined in claim 8 wherein said discharge end has an opening directed towards said intake end.

10. An after cooler as defined in claim 7 but further characterized by said sides having bottom edges, and a plurality of similar spaced protuberances along said bottom edges.

References Cited in the file of this patent
UNITED STATES PATENTS

| | | |
|---|---|---|
| 1,552,369 | White | Sept. 1, 1925 |
| 1,749,765 | Hendrickson | Mar. 11, 1930 |
| 2,064,085 | Shippy | Dec. 15, 1936 |
| 2,590,084 | Bernard | Mar. 25, 1952 |
| 2,644,070 | Herbst | June 30, 1953 |